Patented July 2, 1946

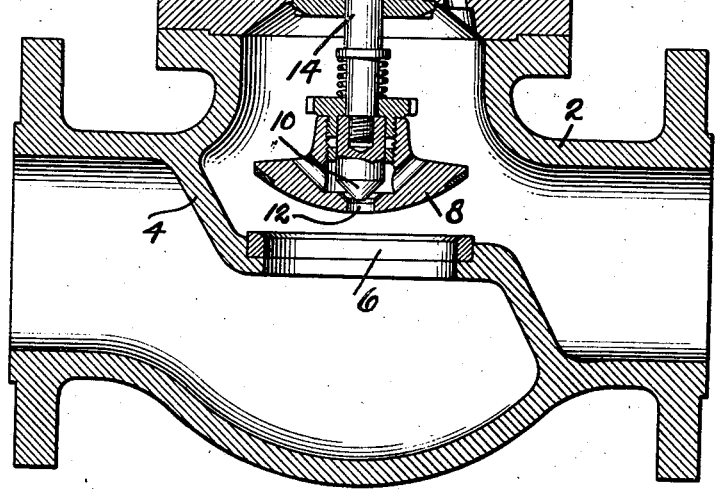

2,403,427

UNITED STATES PATENT OFFICE 2,403,427

VALVE MECHANISM

Oscar H. Ludeman, New York, N. Y., assignor to Skinner Engine Company, Erie, Pa., a corporation of Pennsylvania Application January 27, 1944, Serial No. 519,857

6 Claims. (Cl. 137—139)

My invention relates to an improvement in valves, and has for one of its objects to provide mechanism whereby the valve is definitely held in full open or intermediate position irrespective of any steam pull on the valve due to high velocities.

In the accompanying drawing:

Fig. 1 is a sectional elevational view of one embodiment of my invention;

Fig. 2 is a section on the line 2—2 of Fig. 1; and

Fig. 3 is a perspective of part of the latching mechanism.

Referring to the drawing in detail: 2 designates the valve housing equipped with diaphragm 4, provided with port 6, controlled by main valve 8. Built into the main valve is a by-pass valve 10 for controlling the by-pass port 12 with which the main valve is provided.

14 designates a valve stem to which the by-pass valve is directly connected, the stem being common to both the main valve and the by-pass valve. The valve stem extends into a cylinder 16 which is carried by the valve housing 2. This cylinder is provided with lining sleeve 18 spaced from the walls of the cylinder. Adjacent its inner end the liner 18 is provided with pressure release port 20, communicating with pressure release port 22 opening to the exterior of the cylinder 16, and adjacent its outer end the liner 18 is provided with ports 24.

The valve stem 14 carries a piston 26 which is a loose fit in the liner 18 as clearly illustrated in Fig. 2. The piston 26 floats on the stem 14 and is held in its innermost position on the stem (upward position as illustrated) by spring 28 which is interposed between the piston and a shoulder 30 provided on the valve stem.

32 designates a conventional handwheel stem, this stem extending into the cylinder 16 and its inner end being machined to provide a latching seat designated 34.

36 is a latch member which cooperates with the latching seat 34. The latch member 36 is bifurcated so that its two sides 38 and 40 may straddle the valve stem 14, and it is pinned to the stem by pin 41, which functions as a fulcrum or pivot for the latch.

Each of the side members or arms 38 and 40 of the latch carries an inwardly projecting pin or stud 42 which constantly engages a groove in a screw or stud 44 which is rigidly secured to the piston 26.

Assuming that my improved valve is in open position and on steam service, with steam under pressure: Under this condition the pressure release line 22 is closed, and inasmuch as steam can enter the cylinder 16 by way of port 23, thence between the liner 18 and the cylinder walls and through the ports 24 into the liner; and inasmuch as the piston 26 is a loose fit in the cylinder liner, the steam pressure is equal on both sides or faces of the piston. At this time it is to be appreciated that the latch 36 is in latching position with respect to the inner end of the wheel stem 32.

To effect closure of the valve 10 it is merely necessary to open the pressure release line 22, and inasmuch as the area of this port far exceeds the annular area around the piston 26, the pressure on the outer face of the piston 26, namely the face remote from the pressure release line, will remain normal while there will be a drop in pressure on the opposite face of the piston.

When this pressure drop occurs the piston 26 will overcome the spring 28 and move the piston into contact with the shoulder 30 on the valve stem 14. This movement of the piston carries with it the stud 44. Engagement of the lugs 42 with the upper abutment formed by the groove in the stud 44, these lugs, as above pointed out, always engaging this groove, pivots the latch 36 about the pin or fulcrum 41 to disengage the latch seat 34 on the wheel stem 32.

The latch member 36 now being unlatched, the piston 26 together with valve stem 14 will then move outwardly of the cylinder 16 to seat the valves 10 and 8.

To reopen the valves it is merely necessary to close the pressure release 22, so that the pressure on the two faces of the piston are again balanced, turn the wheel stem down so as again to engage the latch member 36, bearing in mind that the spring 28 will move the piston 26 outwardly of the valve stem again when the pressure on the two faces of the piston are again balanced so that the latching member 36 is once more in its original position with respect to the piston, that is, stands normal to the piston face, whereupon the valve 8 may be moved positively toward open position to any extent desired simply by rotating the handwheel stem and be held there positively.

It will be appreciated from the foregoing that I have provided valve mechanism whereby the valve which is closed by the action of the pressure fluid to be controlled is opened manually and definitely held in full open or any intermediate position by a simple latch mechanism and is held in such position irrespective of any pull on the valve due to high velocities of the pressure fluid being controlled.

It is to be understood that changes may be made in the details of construction and arrangement of parts herein illustrated and described without departing from the spirit and scope of my invention.

What I claim is:

1. Valve mechanism comprising in combination a valve, a stem therefor, a piston slidably mounted on the valve stem, a spring for holding the piston in its outermost position on the stem, a latching member fulcrumed to said stem, means offset with respect to said fulcrum for connecing the latching member to said piston, a handwheel stem provided with a latching shoulder for engagement with said latching member to hold said valve off its seat, movement of said piston on said valve stem against the action of said spring, pivoting the latching member on the said fulcrum to disengage the latching member from the handwheel stem to permit said valve to close.

2. Valve mechanism comprising in combination a valve, a stem therefor, a piston slidably mounted on the valve stem, a spring for holding said piston in its outermost position on said valve stem, a latching member fulcrumed to the valve stem, a connection between said piston and latching member offset with respect to said fulcrum, a handwheel stem provided with a latching shoulder for engagement with said latching member, means for reducing the pressure on the spring side or face of said piston whereby the piston will be moved inwardly of said valve stem against the action of said spring thereby to pivot the latching member about its fulcrum to disengage the latching member from the said latching shoulder to permit said valve to move toward its seat.

3. Valve mechanism comprising in combination a valve, a stem therefor, a piston slidably mounted on said stem, a spring opposing said movement of said piston, a latching member pivoted to said valve stem and attached to said piston at a point offset with respect to said piston, a handwheel stem provided with a latching shoulder for cooperation with said latching member, and means for establishing a reduction in the pressure on the spring side of said piston whereby the piston will be actuated along said stem against the action of said spring to pivot the latch member thereby to effect disengagement of the same from said shoulder, and a stop on the valve stem for limiting this sliding movement of the piston, whereby when the stop is engaged the valve stem will be actuated toward valve closing position.

4. Valve mechanism comprising in combination a valve, a valve stem therefor, a piston slidably mounted on the valve stem, a latching member pivotally attached to said valve stem, a stud connected to the latching member and carried by the piston, said stud being offset with respect to the pivotal attachment of the latching member to the valve stem, whereby movement of the piston along said stem toward said valve will effect pivoting of the latching member out of latching position, and a spring for opposing this pivoting of the latching member.

5. Valve mechanism comprising in combination a valve, a valve stem therefor, a piston slidably mounted on the valve stem, a latching member pivotally attached to said valve stem, a stud connected to the latching member, said stud being carried by the piston and offset with respect to said pivotal attachment of the latching member to the valve stem, whereby movement of the piston along said stem toward said valve will effect pivoting of the latching member out of latching position, and a spring on the valve stem cooperative with said piston for opposing the said pivoting of the latching member.

6. Valve mechanism comprising in combination a valve, a valve stem therefor, a piston slidably mounted on the valve stem, a spring for opposing sliding movement of the piston toward said valve, a bifurcated latching member the two sides of which extend at either side of the valve stem, a pin passing through said sides and engaging the valve stem to provide a pivotal connection between the latching member and the valve stem, a grooved stud rigid with said piston and offset with respect to said pin, and lugs carried by the latching member and engaging the groove in said stud, whereby movement of the piston along the valve stem toward the valve against the action of said spring will effect pivoting of the latching member out of latching position.

OSCAR H. LUDEMAN.